(12) United States Patent
Anglade

(10) Patent No.: US 10,034,522 B1
(45) Date of Patent: Jul. 31, 2018

(54) WALKING CANE AND REACHER DEVICE

(71) Applicant: Stephany Anglade, Jackson, NJ (US)

(72) Inventor: Stephany Anglade, Jackson, NJ (US)

( * ) Notice: Subject to any disclaimer, the term of this patent is extended or adjusted under 35 U.S.C. 154(b) by 0 days.

(21) Appl. No.: 15/291,453

(22) Filed: Oct. 12, 2016

Related U.S. Application Data

(60) Provisional application No. 62/247,919, filed on Oct. 29, 2015.

(51) Int. Cl.
| | |
|---|---|
| *A45B 3/00* | (2006.01) |
| *B25J 1/04* | (2006.01) |
| *A45B 3/04* | (2006.01) |
| *A45B 9/02* | (2006.01) |
| *A45B 9/04* | (2006.01) |
| *A45B 9/00* | (2006.01) |

(52) U.S. Cl.
CPC ............... *A45B 3/04* (2013.01); *A45B 9/02* (2013.01); *A45B 9/04* (2013.01); *B25J 1/04* (2013.01); *A45B 2009/007* (2013.01); *A45B 2009/025* (2013.01)

(58) Field of Classification Search
CPC .... A45B 3/00; A45B 3/02; A45B 9/02; A45B 9/04; A45B 2009/007; A45B 2009/025; A45B 3/04; A61H 3/00
USPC ......... 135/65–66, 68, 70, 72, 74–75, 79–81, 135/910; 294/19.3, 50.6, 104, 107, 198, 294/86.4, 86.32
See application file for complete search history.

(56) References Cited

U.S. PATENT DOCUMENTS

| | | | |
|---|---|---|---|
| 1,350,331 A | 8/1920 | Pedersen | |
| 2,181,520 A | 11/1939 | Pedersen | |
| 2,346,038 A | 4/1944 | Mason | |
| 3,093,402 A | 6/1963 | Sisson | |
| 3,265,429 A * | 8/1966 | Shatt | B25J 1/04 |
| | | | 294/104 |
| 3,467,116 A | 9/1969 | Ringewaldt | |
| 3,763,872 A | 10/1973 | Gooley | |
| 3,977,422 A | 8/1976 | Cabaluna | |
| 4,299,246 A | 11/1981 | Marsh | |
| 4,711,482 A * | 12/1987 | Brown | A61F 4/00 |
| | | | 294/107 |
| 4,758,035 A | 7/1988 | Shimasaki | |
| 4,811,750 A | 3/1989 | McAllister | |
| 5,176,160 A | 1/1993 | Osborn | |
| 6,386,216 B1 * | 5/2002 | Cubelli | A61H 3/02 |
| | | | 135/66 |
| 7,841,353 B2 * | 11/2010 | Lee | A45B 9/00 |
| | | | 135/74 |
| 8,122,900 B1 * | 2/2012 | Hayes | A45B 3/00 |
| | | | 135/66 |

(Continued)

*Primary Examiner* — Winnie Yip
(74) *Attorney, Agent, or Firm* — Cramer Patent & Design, PLLC; Aaron R. Cramer

(57) ABSTRACT

A combination cane and reaching device within the cane body having a longitudinal axis and terminating in a pair of grabber ends which are concealed by a stopper at a distal end of the cane. The grabber ends are exposed when the rubber bottom of the cane is removed. The grabber ends are actuated when the cane handle at the proximal end is gripped and squeezed. The combination cane and reaching device is capable of being collapsed by folding the cane body back upon itself. This feature allows the cane to be stored in an unobtrusive manner. The combination cane and reaching device also contains a flashlight in the handle.

14 Claims, 5 Drawing Sheets

(56) References Cited

U.S. PATENT DOCUMENTS

| | | | | |
|---|---|---|---|---|
| 8,381,748 B2* | 2/2013 | Martin | .................... | A45B 3/00 |
| | | | | 135/66 |
| 8,544,487 B1 | 10/2013 | Clinkscales | | |
| 8,978,677 B2* | 3/2015 | Roberts | .................... | A45B 3/00 |
| | | | | 135/66 |
| 9,131,753 B2* | 9/2015 | Chien | ..................... | A45B 3/04 |
| 9,226,555 B1* | 1/2016 | Shyu | ........................ | A45B 9/02 |
| 2006/0266397 A1* | 11/2006 | Berl | ........................ | A61H 3/02 |
| | | | | 135/70 |
| 2014/0035305 A1 | 2/2014 | Ludwig et al. | | |
| 2015/0250275 A1* | 9/2015 | Dole | ........................ | A45B 3/00 |
| | | | | 135/66 |
| 2016/0095397 A1* | 4/2016 | Crowhurst | ............... | A45B 9/00 |
| | | | | 135/66 |

\* cited by examiner

WALKING CANE AND REACHER DEVICE

RELATED APPLICATIONS

The present invention was first described in and claims the benefit of U.S. Provisional Application No. 62/247,919 filed Oct. 29, 2015, the entire disclosures of which are incorporated herein by reference.

FIELD OF THE INVENTION

The present invention relates generally to a walking cane having an integral reaching device.

BACKGROUND OF THE INVENTION

People with physical disabilities, such as the elderly, the handicapped, or those recovering from injuries or surgery know all too well of some of the difficulties that he or she may encounter while performing physical tasks that physically enabled individuals may take for granted. What comes easily to those that are not physically challenged, such as climbing stairs or bending down to tie one's shoes, requires extreme physical exertion, or worse yet, is altogether impossible to accomplish without assistance for those who are injured or disabled.

In the addition to a cane, one (1) aid which has been a great use to injured or disabled individuals is that of a grabber reaching aid. Such an aid not only allows people to reach items that are at high locations, but also allows them to pick up lowly placed items such as those on the floor that they could not otherwise reach. Unfortunately, this grabbing aid typically remains at one (1) static location separate from the cane thereby forcing the user to retrieve the aid before performing any reaching or grabbing tasks.

While this may pose a minor inconvenience while at home, it is a major disadvantage when out shopping, traveling in a car, or at other locations because the grabbing aid may not simply be available. Furthermore, in the case of low light conditions, an illumination means, both serving the purpose of illuminating the immediate area adjacent the cane and the user, or to aid in viewing items about to be grasped, is also helpful. Accordingly, there exists a need for a means by which a grabbing aid with a light source can remain in a single device in a nearby and handy location at all times. The use of the device ensures the ready and handy availability of a cane, grabbing aid and light source in a manner which is quick, easy, and effective.

SUMMARY OF THE INVENTION

The inventor has recognized the aforementioned inherent problems and lack in the art and observed that there is a need for a walking cane having an integral reaching device.

It is therefore an object of the invention to provide a cane, comprising a first section which defines an interior first section cavity and has a first section first end and a first section second end, a handle which defines an interior handle cavity and is secured perpendicularly to the first section first end, a compartment which is located within the handle and retains a power source, a second section which defines an interior second section cavity and has a second section first end which slidably engages with the first section second end and a second section second end, a third section which defines an interior third section cavity which has a third section first end which slidably engages with the second section second end, a distal section which defines an interior distal section cavity and has a distal section first end which slidably engages with the third section second end and a distal section second end, an end cap assembly which is secured to the distal section second end and covers the interior distal section cavity, a grasping device which is housed within the distal section and is capable of protruding outwardly from a distal section second end, and a height adjustment means which is located within the first section and is capable of selectively adjusting the length of the second section, the third section, and the distal section relative to the first section. The height adjustment means is in mechanical communication with a height adjustment actuator which is located on the first section. The cane also comprises a grasping adjustment means which is in mechanical communication between the grasping device and a grasping adjustment actuator which is located on the first section. The grasping adjustment means is adapted to be in electrical communication with the power source. In an alternate embodiment, the cane has no third section.

The handle may also comprise of a handle first end, a handle second end, a grip which is disposed across an underside handle surface, a thumb pad which is secured at the handle first end, a hub which is secured perpendicularly and is adjacent to the handle first end and an actuator switch which is disposed within the hub and is subjacent to the thumb pad and in electrical communication with the power source.

The first section may also comprise of a height adjustment actuator which has a slide tube with a slide tube first end that is configured to slide within a slide tube second end, a spring tube with a spring tube first end and spring tube second end, a first prong platform which is disposed within and subjacent to the spring tube second end, a pair of first prongs which are disposed within the first prong platform with each prong being in electrical communication with the power source and the actuator switch, a plurality of button apertures which are disposed along a length of the slide tube, and a spring-biased lock button which is disposed inside of the spring tube first end which projects through any button aperture when so aligned. The spring-biased lock button may be selectively disengaged from a given button aperture which permits the spring tube to extend or contract within the slide tube. The first section may further comprise of a light fixture which is disposed along a leading side of the slide tube and a light switch which is located superjacent to the light fixture and is in electrical communication with the light fixture and the power source. An eyelet may be secured to the hub.

The second section may comprise of a second section neck having an opening which is disposed at the second section first end, a first receptacle platform which is disposed within and subjacent to the second section neck opening, a pair of first receptacles which are disposed within the first receptacle platform, a second prong platform which is disposed within and subjacent to the second section second end and a pair of second prongs which are disposed within the second prong platform with each prong being in electrical communication with the pair of first receptacles. The pair of first prongs are configured to slidingly engage the pair of first receptacles when the second section neck is secured within the spring tube second end.

In embodiments with a third section, the third section operates in much the same way as the second section and comprises of a third section neck which has an opening that is disposed at the third section first end, a second receptacle platform which is disposed within and subjacent to the third section neck opening, a pair of second receptacles which are disposed within the second receptacle platform, a third prong platform which is disposed within and subjacent to the third section second end and a pair of third prongs which are disposed within the third prong platform with each prong being in electrical communication with the pair of second receptacles. The pair of second prongs are configured to slidingly engage the pair of second receptacles when the third section neck is secured within the second section second end.

The distal section may also comprise of a tube bell which has an opening that is disposed at the distal section first end, a third receptacle platform which is disposed within and subjacent to the tube bell opening, a pair of third receptacles disposed which are within the third receptacle platform, a limit switch which is disposed subjacent to the third receptacle platform and in electrical communication with the pair of third receptacles, a reversing relay which is disposed subjacent the limit switch and in electrical communication with the pair of third receptacles and a grasping motor which is disposed subjacent to the reversing relay in electrical communication with the pair of third receptacles and the reversing relay. The grasping device is in mechanical communication with the grasping motor. The end cap is hingedly secured over the distal section second end. The pair of third prongs are configured to slidingly engage the pair of third receptacles when the tube bell is secured within the third section second end. The grasping motor and reversing relay are in electrical communication with the power source and the actuator switch when the pair of third receptacles are secured about the pair of third prongs, when the pair of second receptacles are secured about the pair of second prongs, and when the pair of first receptacles are secured about the pair of first prongs. In embodiments lacking a third section, the second section interacts with the distal section in the same manner as the third section.

The cane may also comprise of a first elastic cord which tethers the first prong platform to the first receptacle platform, a second elastic cord which tethers the second prong platform to the second receptacle platform and a third elastic cord which tethers the third prong platform to the third receptacle platform. In embodiments lacking a third section there is subsequently no third elastic cord. The elastic cord may comprise a water-resistant material.

The grasping device may also comprise of a carriage extension spring which is secured within a distal end of the distal section tube cavity while being secured to the grasping motor first end, a lead screw which projects perpendicularly from the grasping motor second end and is in mechanical communication with the grasping motor, a mounting plate with a central aperture which is secured to the grasping motor second end with the lead screw positioned through the central aperture, a pair of carriage first plates each which have a pair of carriage first plate apertures, a pair of carriage second plates which are secured in parallel on opposite sides of the central aperture while also being subjacent and perpendicularly secured to the carriage first plates, a pair of grasping fingers with each having a cog and an aperture which are at a proximal end thereof and a fingertip at a distal interior side end, a pair of pivot pins each securing one (1) of the pair of grasping fingers within a pair of opposing the carriage first plate apertures and a pair of pivot pin retainers which retain one of the pair of grasping fingers to the pivot pin. The grasping fingers are positioned with each fingertip facing each other. Each one (1) of the grasping fingers is positioned with each cog facing each other and is in mechanical communication with the lead screw. The carriage spring is liberated from the distal end of the distal section cavity by opening the end cap. When this occurs, full extension of the carriage spring activates the limit switch and subsequently the grasping motor, thereby resulting in a first rotation of the lead screw and motioning each the grasping finger apart. When the actuator switch is activated, the lead screw rotates in a second direction, thereby motioning each the grasping finger together. When the actuator switch is deactivated, the lead screw rotates in the first direction thereby motioning each the grasping finger apart.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
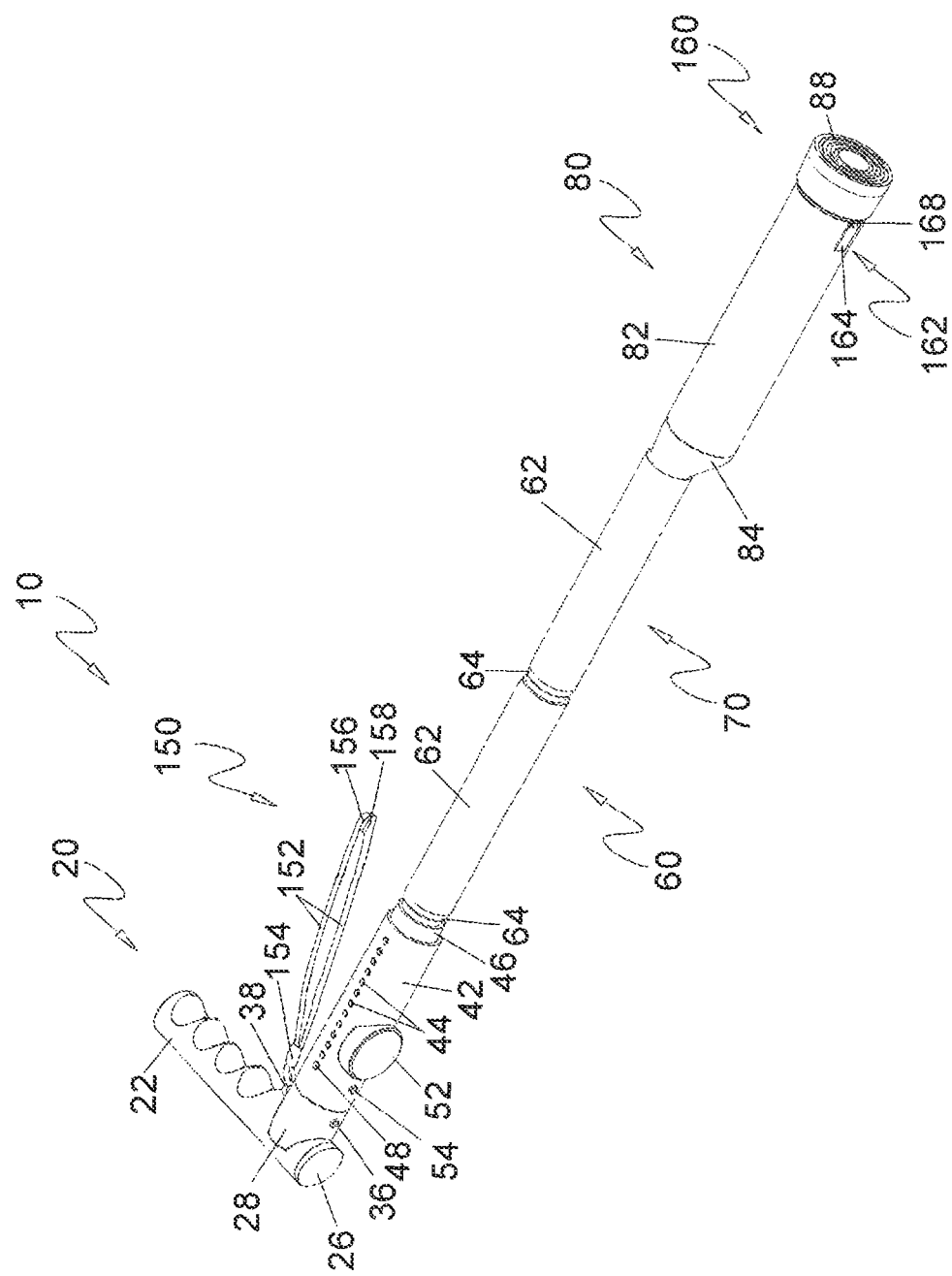
FIG. 1 is a view of a walking cane 10 in accordance with the preferred embodiment of the present invention.

DESCRIPTIVE KEY 10 walking cane
20 first section
22 handle
24 grip
26 thumb pad
28 hub
32 battery compartment
34 battery
36 actuator button
38 eyelet
40 height adjustment actuator
42 slide tube
44 button aperture
46 spring tube
48 lock button
52 light fixture
54 light switch
56 illumination
60 second section
62 support tube
64 neck
66 elastic cord
70 third section
80 distal section
82 distal tube
84 tube bell
88 end cap
90 grasping device
92 carriage 94 carriage first plate
96 carriage second plate
98 carriage plate aperture
102 grasping finger
104 finger tip
106 finger aperture
108 cog
112 finger pivot pin
114 pivot pin retainer
116 grasp motor
118 mounting plate
122 lead screw
124 carriage extension spring
126 detent
130 electrical circuit
132 prong
134 prong platform
136 receptacle
138 receptacle platform
142 limit switch
144 reversing relay
150 wrist strap
152 thong
154 ferrule
156 first fastener
158 second fastener
160 end cap assembly
162 end cap hinge
164 cane leaf
166 cane knuckle
168 hinge pin
172 tip leaf
174 tip knuckle
176 cam
178 latch
180 wiring

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a walking cane 10 with an extendable grasping device 90 (herein referred to as the "apparatus") which provides an assistance with mobility adapted to incorporate a reaching and grasping device 90 concealed within the walking cane 10 until the time of use. The apparatus 10 is additionally configured to comprise four (4) segments 20, 60, 70, 80 which can be adjustably modified to collapse into a foreshortened arrangement for storage purposes. It is appreciated that the walking cane is fabricated out of waterproof materials to combat rusting and provided with seals to resist the ingress of water or debris within the cane to protect the electrical circuitry.

Referring now to FIG. 1, an isometric view of the apparatus 10 according to the preferred embodiment of the present invention, is disclosed. The apparatus 10 includes a first section 20 with a handle 22, a cylindrical second section 60, a similarly configured third section 70, and a distal section 80 housing the grasping device 90. The first section 20 is provided with a handle 22 capable of being grasped by a user to exert full manual control over the apparatus 10 in all configurations and uses and a height adjustment actuator 40. In the preferred embodiment, the handle 22 is generally cylindrical with a convoluted surface on a lower side forming a grip 24 to more comfortably comply with the shape of a user's hand. In other embodiments, the handle 22 may assume any number of stylized shapes, such as, but not limited to, a human torso, or a reptile, or any curvilinear form which may suit the taste of a user without limiting the scope of the apparatus 10. The handle 22 is composed of a high-strength, rigid polymer which can be formed into any number of presentations. It is understood that other materials, such as wood, or some metals, may also be utilized without limiting the scope of the apparatus 10. The handle 22 is configured to have a hub 28 located at, or near, a radial end corresponding to a radial side of a user's hand. The hub 28 is set approximately perpendicular to the longitudinal axis of the handle 22 and is composed of the same constituent material as the handle 22. The handle 22 may terminate at the hub 28, or may be continuous for some distance so as to present a thumb pad 26 which may provide the user with increased leverage to control the apparatus 10.

The hub 28 is sized to be pressed into a first end of a slide tube 42 which comprises a portion of the height adjustment actuator 40. Alternate fabrication methods may be utilized to conjoin the slide tube 42 with the hub 28. The height adjustment 40 includes a spring tube 46, and a slide tube 42 composed of round aluminum alloy tubing. This particular embodiment, utilizing aluminum alloy tubing, has a coincidental beneficial effect of providing for the common leg of the electrical circuit 130 without deploying additional wires. Other metals, or high-strength composites, having made appropriate consideration for the electrical circuit 130, may also be utilized without limiting the scope of the apparatus 10. The spring tube 46 is configured to fit inside of the slide tube 42; however, a relative sliding motion between the spring tube 46 and the slide tube 42 can occur under certain circumstances thereby governing the overall length of the first section 20. Disposed inside of a first end of the spring tube 46 is a spring-biased lock button 48. The lock button 48 projects through an aperture (not shown) in the first end of the spring tube 46 and is generally maintained in this position by means of an internal spring (not shown). Disposed along the length of the slide tube 42 is a plurality of button apertures 44. The projection of the lock button 48 through the aperture of the spring tube 46 is sufficient to become engaged within one (1) of the button apertures 44 in the slide tube 42 when the apertures 44 are in alignment. The shortest length of the height adjustment actuator 40 occurs when the lock button 48 is engaged in the button aperture 44 at a first end of the slide tube 42. The longest length of the height adjustment actuator 40 occurs when the lock button 48 is engaged in the button aperture 44 at a second end of the slide tube 42. The lock button 48 can be depressed to be forced from an engaged button aperture 44 in order to modify the height adjustment actuator 40.

Figure 2:
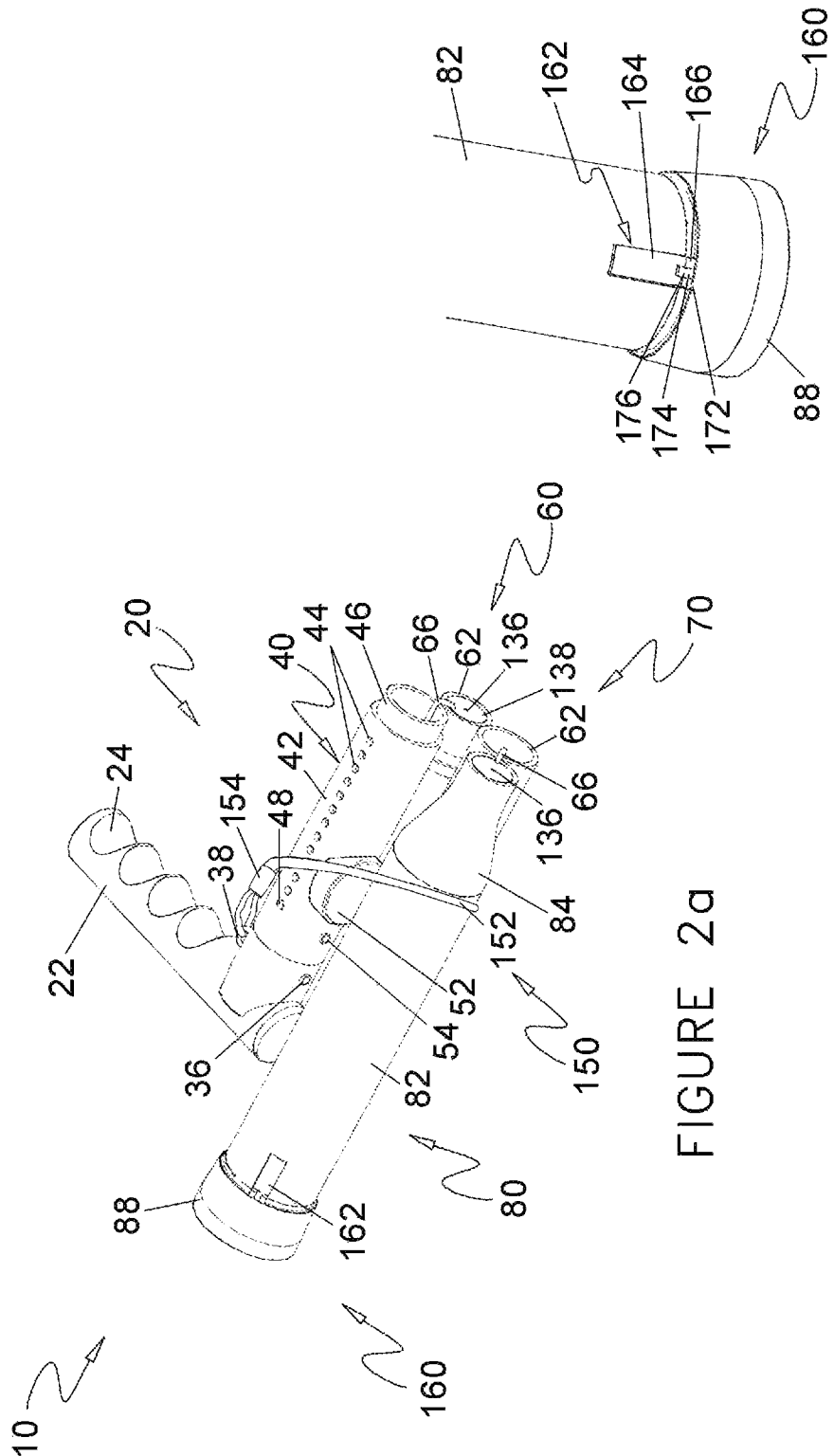
FIG. 2a is an isometric view of the walking cane 10 in a collapsed configuration in accordance with the preferred embodiment of the present invention.
FIG. 2b is an isolated view of an end cap assembly 160 with an end cap hinge 162 of the walking cane 10 in accordance with the preferred embodiment of the present invention.

A light fixture 52 is disposed along a leading side of the slide tube 42 so as to cast illumination 56 on a path of travel when activated. The light fixture 52 is in electrical communication with a light switch 54 disposed along the slide tube 42 with any interconnecting wiring 180 provided in an insulated, protective coating on the exterior of the slide tube 42. The light fixture 52 may utilize any illumination source, such as LED technology, or an incandescent light source, as may be suitable. The light switch 54 is preferably a three-position switch capable of exciting the illumination source at two (2) selectable levels as well as having a third position reserved for deactivation of the light fixture 52. The light switch 54 is in electrical communication with a battery 34 located in a battery compartment 32. The battery compartment 32 is located in the handle 22 in a preferred embodiment, as illustrated in the breakaway view as shown in FIG. 2 and in FIG. 5. This can be accomplished by adapting the thumb pad 26 to be received into the handle 22 by means of a threaded engagement to enclose the battery compartment 32. The battery 34 may be any type of storage cell capable of supplying a sufficient electromotive force to the electrical circuit 130 to satisfy all of the electrical demands of the apparatus 10.

An actuator switch 36 is disposed along a leading side of the slide tube 42 adjacent to the light fixture 52. The actuator switch 36 is in electrical communication with the battery 34 to ultimately activate the grasping device 90 in the distal section 80 upon the selection of that function by a user. The actuator switch 36 is a spring-biased, normally open, switch configured to transmit an electrical current when depressed.

A second section 60 is attached, by means of a sliding fit, to a second end of the spring tube 46. The second section 60 is comprised of a support tube 62 consisting of an aluminum alloy tube. A first end of the support tube 62 is provided with a neck 64 adapted to slidingly fit within the spring tube 46. A similarly configured third section 70, having an identical support tube 62, is configured to slidingly fit within a second end of the second section 60. In certain embodiments, the third section 70 may be omitted with provision being made to appropriately extend the second section 60 so as to have an adequate overall length of the apparatus 10. In this manner, the apparatus 10 may be collapsed with fewer parts. Each subsequent section 60, 70, 80 will be tethered to the previous section 20, 60, 70, respectively, by means of an elastic cord 66. The elastic cord 66 is a resilient connector which can be expanded to allow the various sections 20, 50, 70, 80 to be separated from each other a sufficient distance to permit the apparatus 10 to be collapsed as depicted in FIG. 2 while still maintaining a proximate relationship to preserve the unity of the apparatus 10 and assist in a preferential assembly procedure. In a retracted configuration, the elastic cord 66 will assist in retaining each first end of a support tube 62 or a distal tube 82 within the second end of the adjacent spring tube 46 or support tube 62, respectively, as the apparatus 10 is properly restructured. The elastic cord 66, in addition to having a resilient member composed of an elastomeric substance, such as rubber, or the like, will have an external covering of a synthetic textile capable of providing a measure of wear resistance and abuse protection. The elastic cord 66 will be sized appropriately to adequately accomplish the intended functions.

Figure 3:
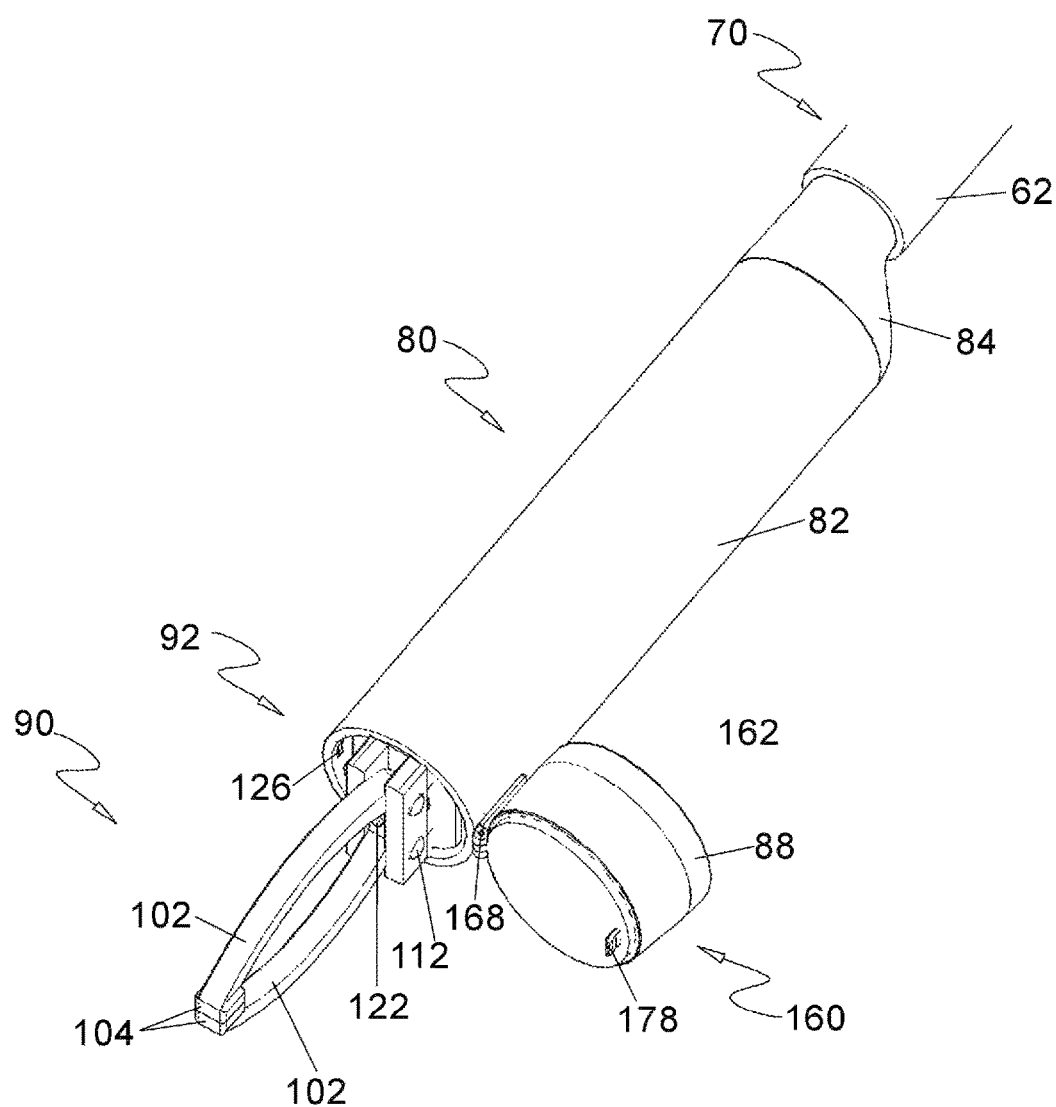
FIG. 3 is an isolated view of the grasping device 90 extended from the distal section 80 of the walking cane 10 in accordance with the preferred embodiment of the present invention.

The distal section 80 includes the distal tube 82 and the grasping device 90 housed therein. The distal tube 82 is composed of an aluminum alloy tube with a first end configured to be sized appropriately to slidingly fit within a second end of the support tube 62 of the previous attached third section 70. The distal tube 82 increases in diameter along the longitudinal axis through a tube bell 84 to be of a larger cross-section in order to accommodate the grasping device 90. The tube bell 84 is herein depicted as having a flared out configuration on the leading side of the distal tube 82 (relative to the actuator switch 36 and light fixture 52), resulting in a larger diameter, than the third section 70 and a coextensive opposing surface. It is appreciated that the tube bell 84 could be configured to have a symmetrical shape with respect to a common center line traveling through the third section 70, second section 60, such that the diameter attached to the distal tube 82 is larger than the diameter adjacent to the third section 70. The second end of the distal tube 82 is provided with an end cap 88 which encloses the interior tube cavity 86 to provide a secure storage space for the grasping device 90. The end cap assembly 160 is configured to be a cylindrical piece of an aluminum alloy bar having the same outside diameter as the distal tube 82. A first end of the end cap assembly 160 is secured to the distal tube 82 by means of an end cap hinge 162 which may be contoured to comply with the cylindrical shape of the distal tube 82. The end cap hinge 162 is configured to include a cane leaf 164, with a pair of cane knuckles 166 attached to the second end of the distal tube 82, a tip leaf 172, with a tip knuckle 174, correspondingly attached to the end cap assembly 160, and a hinge pin 168, as illustrated in FIGS. 2*a* and 3. The annular tip knuckle 174 is aligned between the cane knuckles 166 and secured in that configuration by means of the cylindrical hinge pin 168 inserted through the aligned apertures (not specifically shown). The tip knuckle 174 is permitted to rotate, to a limited degree, about the hinge pin 168 relative to the cane knuckles 166, and the cane leaf 164, so as to permit the end cap assembly 160 to be displaced away from the second end of the distal tube 83 to expose the grasping device 90. The tip knuckle 174 is provided with a cam 176 along an outer surface which will interfere with a subjacent peripheral surface of the distal tube 82 so as to be retained in an over-center configuration when rotated beyond an approximately one hundred seventy degree (170°) position. The cam 176 is configured to be an eccentric swelling of the peripheral surface of the tip knuckle 174.

An end cap 88 is fitted over a second end of the end cap assembly 160 to obviate any marring of a support surface with which the distal tube 82 may come into contact. The end cap 88 is composed of a rubber, or rubber-like, compound specifically formulated with appropriate modifiers to resist wear and other mechanical abuse as well as retaining an inherent toughness and high surface friction qualities.

Referring now to FIG. 2*a*, an isometric view of the apparatus 10, in a collapsed configuration according to the preferred embodiment of the present invention, is disclosed. The apparatus 10 can be collapsed as illustrated for storage or convenient transportation. This can be achieved by exerting a sufficient force on each individual section 20, 60, 70, and 80 to expand the elastic cords 66 therein and slidingly remove the first end of the appropriate section 60, 70, 80 from the second end of the abutting section 20, 60, and 70, respectively, and orient that side-by-each as depicted. It may be desirable to remove the battery 34 from the battery compartment 32 if the apparatus 10 is to be stored for some extended time, or placed in a location which may be deleterious to the battery 34. An eyelet 38, configured to be a torus of the same constituent material as the handle 22, is affixed to the hub 28. The eyelet 38 may be located on a proximal side, or a distal side, of the hub 28 without limiting the scope of the apparatus 10. A wrist strap 150 is inserted through the eyelet 38 and secured with a ferrule 154. The wrist strap 150 is composed of a narrow textile thong 152 having a first fastener 156 at a first end, and a second fastener 158 at a second end. The thong 152 may be composed of a single strip of material or a plurality of strips, interwoven, or braided, in some fashion to comprise a single piece. Other materials, such as a thermoplastic strip, may be utilized without limiting the scope of the apparatus 10. The first fastener 156 is a hooks portion of a hook- and loop fastener, such as VELCRO®, while the second fastener 158 is a complimentary loops portion of such a fastener. It is understood that other types of fasteners, such as metal or plastic snaps, or the like, may serve the same purpose. The thong 152 is swaged in the ferrule 154 in proximity to the eyelet 38 so as to secure the wrist strap 150 to the handle 22. Other provisions, such as a square knot, or other type of knot, may be made be employed to secure the thong 152 to the eyelet 38 in an equally effective manner without limiting the scope of the apparatus 10. The first fastener 156 may be attached to the second fastener 158 so as to form a loop in the thong 152 to removably fasten the wrist strap 150 to a user's wrist while grasping the apparatus 10. During periods of storage, the thong 152 may be wrapped around the collapsed sections 20, 60, 70, and 90 with the first fastener 156 attached to the second fastener 158 to bind the apparatus 10 in that configuration.

Figure 4:
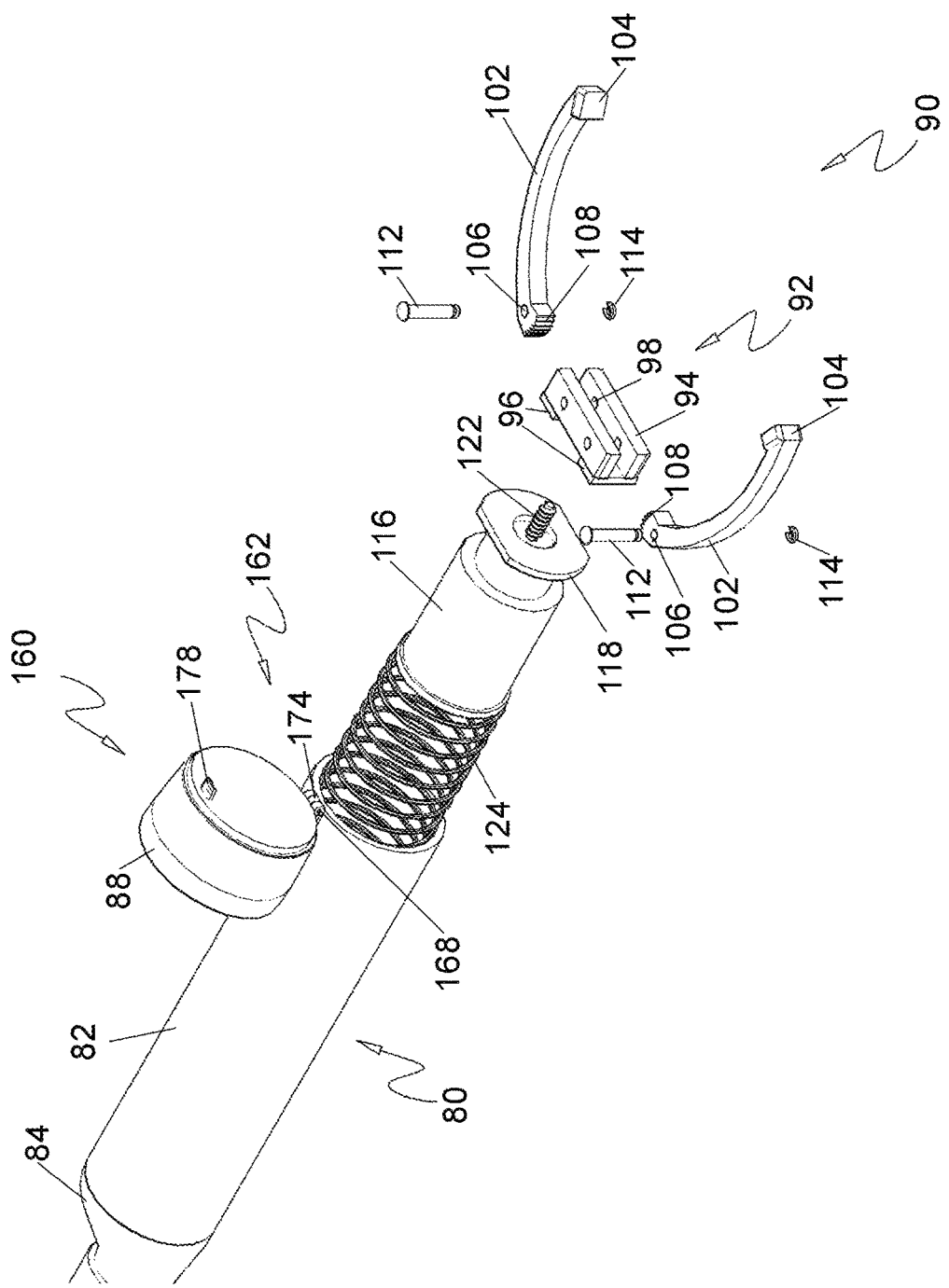
FIG. 4 is an exploded view of the grasping device 90 of the walking cane 10 in accordance with the preferred embodiment of the present invention; and, FIG. 5 is a schematic of the electrical circuit 130 of the walking cane 10 in accordance with the preferred embodiment of the present invention.

Referring now to FIG. 3, an isolated view of the grasping device 90 extended from the distal tube 82, and FIG. 4, an exploded view of the grasping device 90 of the apparatus 10, according to the preferred embodiment of the present invention, are disclosed. The grasping device 90 includes a carriage 92 to which grasping fingers are pivotally attached and an electrically powered grasp motor 116 capable of actuating those grasping fingers 102 by means of a mechanical drive and electronic control mechanism. The carriage 92 includes a pair of parallel, opposing, rectangular carriage first plates 94 attached perpendicularly to a plurality of carriage second plates 96. The carriage plates 94, 96 are common quality, carbon steel plates attached by means of an arc-welding process. Other materials, such as other metals, or high strength polymers, or other fabrication techniques, such as molding, or forging, may be utilized without limiting the scope of the apparatus 10.

The carriage first plates 94 are configured to accommodate the insertion of a pair of opposing grasping fingers 102 between the carriage first plates 94 and are provided with carriage plate apertures 98, aligned in pairs, to which the grasping fingers 102 are pivotally attached. The grasping fingers 102 are configured to be arcuate, steel forgings, or castings having a disc-shaped, or rectangular, finger tip 104 disposed at a distal end and a circular finger aperture 106 formed in a proximal end. A plurality of radial projections is evenly spaced about the proximal end of the grasping finger to form a cog 108, or set of teeth, which can be utilized as lever arms to pivot the grasping finger 102. A cylindrical, headed, finger pivot pin 112 is inserted through the aligned carriage plate apertures 98 and finger aperture 106 to affix each grasping finger 102 between the first carriage plates 94. The finger pivot pins 112 are fastened in the apertures 98, 106 by means of a pivot pin retainer 114, such as a snap ring, or the like. When the cogs 108 are oriented in an opposing fashion, as preferentially illustrated, a force exerted upon a proximally situated face of a tooth directed toward the finger tips 104 will result in the finger tips being forced apart, thereby enlarging a distance between the finger tips 104 so as to open the grasping fingers 102. Conversely, a force exerted on a distally situated face of the teeth directed away from the finger tips 104 will result in the finger tips 104 being forced together, or closed.

A grasp motor 116 is removably affixed to the carriage second plates 96 via a mounting plate 118 attached to the grasp motor 116. The grasp motor 116 is comprised of any of a variety of commercially available, copper wound, low voltage, small frame, reversible, direct current, stepper motors 116 with an output shaft capable of being connected to a lead screw 122 to generate a sufficient torque to induce the desired force upon the cogs 108. The grasp motor 116 is provided with an encoder which tracks the precise location of the rotor to assure that the grasping fingers 102 are not overdriven in any one (1) direction. The grasp motor 116 is electrically powered, through the actuator switch 36 in a closed direction, and by direct connection through a limit switch 142, by the battery 34 located within the battery compartment 32. The lead screw 122, attached to the grasp motor 116 output shaft is essentially a circular inclined plane which can exert a force against the faces of the teeth of the cogs 108 on the grasping fingers 102 in either direction depending upon the rotation of the grasp motor 116. As the plane of the flight of the lead screw 122 advances, a force is exerted upon a proximally situated face of a tooth of the cog 108 directed toward the finger tips 104, thereby opening the grasping fingers 102. As the tooth rotates about the finger pivot pin 112 another succeeding teeth is drawn into engagement with the advancing flight of the lead screw to continue the rotation, and thus the opening action, of the grasping fingers 102. At a predetermined orientation of the grasping fingers 102, equivalent to a fully opened position, the grasp motor 116 is de-energized leaving the grasping device 90 in an open position. At this point the distal section 80 of the apparatus 10 may be elevated and placed in proximity to a selected item to be retrieved. With some practice, a sufficient level of dexterity may be developed to place the grasping fingers 102 into contact with the item to be retrieved, or to deploy the apparatus 10 in such a manner so as to grasp the item between the finger tips 104. To grasp the item, the actuator switch 36 is depressed to energize a reversing relay 144 on the grasp motor 116 to rotate the grasp motor 116 in an opposite direction from the previous scenario so as to rotate the lead screw 122 in a direction which causes the plane of the flight of the lead screw 122 to recede toward the grasp motor 116 thereby exerting a force upon the distally situated faces of the teeth of the cogs 108 resulting in the closure of the grasping fingers 102 now set to envelope the item.

A latch 178 is attached to, and projects perpendicularly from the end face of the first end of the end cap assembly 160 in proximity to the peripheral edge of the end cap assembly 160. The latch 178 is located diametrically opposite from the end cap hinge 162. The latch 178 is configured to be a projection with an arcuate surface which can interfere with a concave detent 126 located along an inner surface of the distal tube 82 when the end cap assembly 160 is rotated to the closed position over the end of the distal tube 82. The detent 126 is also located diametrically opposite from the end cap hinge 162. As stated previously, the grasping device 90 is housed within the tube cavity 86 of the distal tube 82. When the end cap assembly 160 is rotated away from the end of the distal tube 82, a carriage extension spring 124, also enclosed within the tube cavity 86, is permitted to extend thereby positioning the carriage 92 at the second end of the distal tube 82 with the grasping fingers 102 wholly projecting from the end of the distal tube 82. Simultaneously, a limit switch 142, also located within the tube cavity 86, and previously in intimate contact with the now extended grasping device 90, energizes the electrical circuit 130 to rotate the grasp motor 116 to open the grasping fingers 102. The electrical circuit 130 will be further explained in the following narrative. Alternately, a single activation of the actuator switch 36 commands the grasp motor 116 to open the grasping device 90 fully. A subsequent activation of the actuator switch 36 commences the closing of the grasping device 90. An interlock switch (not shown), once sensing an increased amperage of the grasp motor 116 due to a restrictive force applied by a grasped item to the grasping fingers 102 of the grasping device 90, ceases activation of the grasp motor 116 to arrest closing of the grasping device 90.

Figure 5:
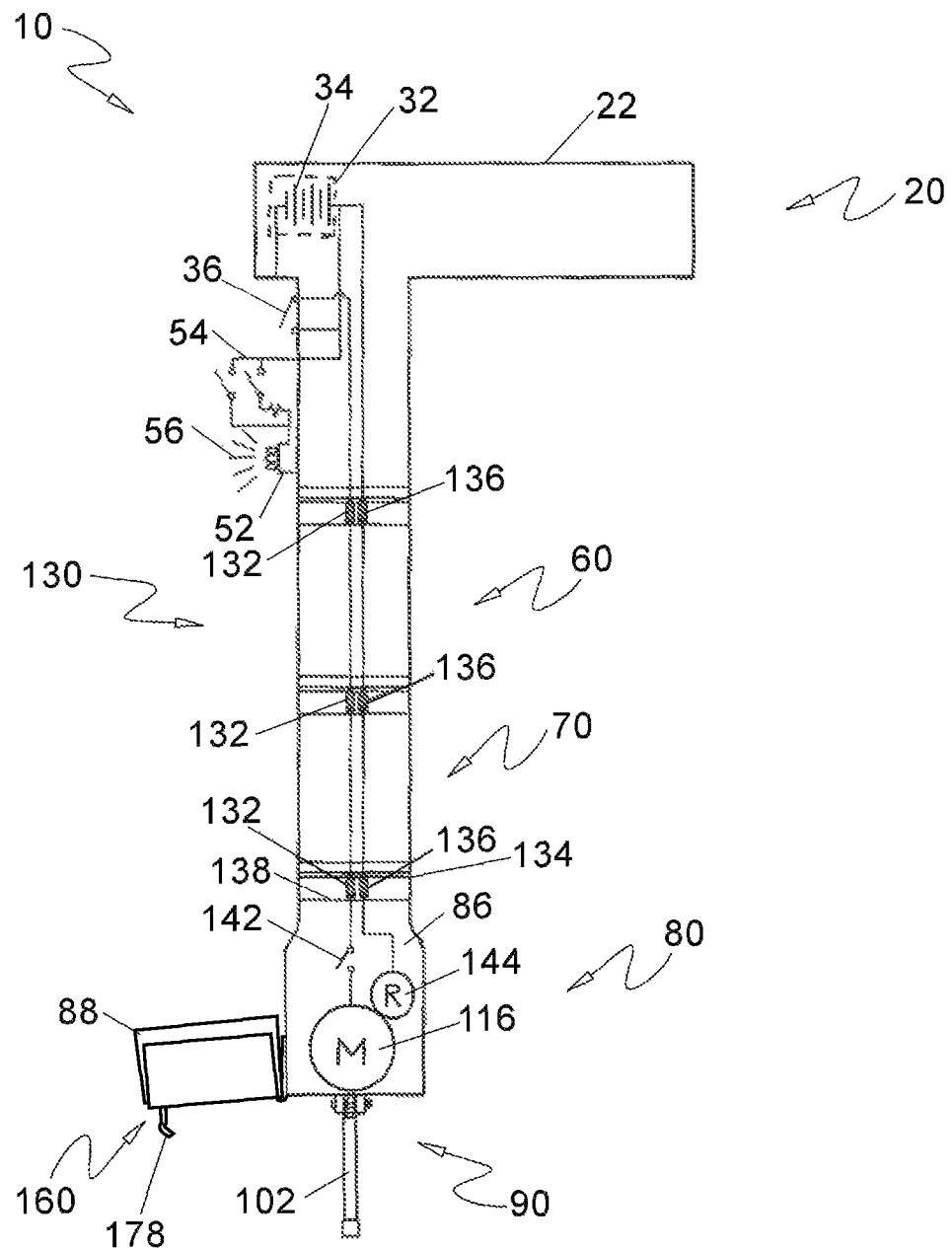

Referring now to FIG. 5, a schematic of the electrical circuit 130 of the apparatus 10, according to the preferred embodiment of the present invention, is disclosed. The battery 34 is disposed within the battery compartment 32 in the first section 20 as stated previously. The light fixture 52 and the light switch 54 as shown in FIG. 5 were fully explained in the previous paragraphs. A direct connection between the battery 34 in the handle 22 and the limit switch 142 in the distal tube 82 is enabled through each of the first section 20, the distal section 80, and any intervening sections 60, 70 by means of a series of prong 132 and receptacle 136 connections repeated at each juncture between the sections 20, 60, 70, and 80. A direct connection between the actuator switch 36 and the reversing relay 144 on the grasp motor 116 in the distal section 80 is accomplished through an identical series of prong 132 and receptacle 136 connections. The prong 132 is an electrical current conducting, metal blade or cylindrical rod capable of being inserted into a complimentary current conducting metal receptacle 136 as is similar to any plug-in electrical connection. The matching prongs 132 of each connection are disposed within a prong platform 134 configured to be a plate of an electrically non-conducting material, such as a polymer or wood, pressed into the second end of each of spring tube 46 and the support tubes 62. The prong platform 134 is located a sufficient distance from the second end of these tubes 46, 62 as to adequately accommodate the first end of the next successive connecting tube 62, 82 as well as the interconnecting elastic cord 66.

The receptacles 136 are disposed as a matching pair in a receptacle platform 138 configured to be a plate of an electrically non-conducting material, similar to the prong platforms 134. The receptacle platforms 138 are pressed into the first ends of the support tubes 62 and the distal tube 82 at a location very near to the ends of those tubes 62, 82. The first section 20 is provided with a pair of prongs 132, within a prong platform 134, at the second end of the spring tube 46. Each support tube 62 is provided with a pair of receptacles 136, within a receptacle platform 138, in proximity to the first end in individual communication with a respective pair of prongs 132, within a prong platform 134, near the second end. The distal tube 82 is provided with a pair of receptacles 136, within a receptacle platform 138, located very near to the first end of the distal tube 82. The prongs 132 are located in the prong platform 132 to align with a preferential receptacle 136 in each abutting section 20, 60, 70, 80 to make a connection and not cross wires 180. The elastic cords 66 are attached between abutting platforms 134, 138.

The preferred embodiment of the present invention can be utilized by an enabled individual in a simple and straightforward manner with little or no training. Upon the initial purchase or acquisition of the apparatus 10, it would be arranged as indicated in FIG. 2 in a collapsed state. The method of utilizing the apparatus 10 may be achieved by performing the following steps: acquiring a model of the apparatus 10 having a desired style to suit the taste of a user; disengaging the first fastener 156 of the wrist strap 150 from the second fastener 158; removing the thong 152 from around the bundled apparatus 10; unfolding the collapsed apparatus 10; inserting a first end of the support tube 62 of the second section 60 into a second end of the spring tube 46; aligning the prong 132 in the prong platform 134 of the spring tube 46 with the receptacle 136 in the receptacle platform 138 of the second section 60; allowing the elastic cord 66 to draw the support tube 62 into full engagement with the spring tube 46; repeating the previous sequence with any remaining sections 70, 80 until the apparatus is arranged as illustrated in FIG. 1; opening the battery compartment 32 by removing the thumb pad 26 from a threaded engagement with the handle 22; installing an appropriate battery 34 into the battery compartment 32, observing the proper electrical polarity; reinstalling the thumb pad 26 onto the handle 22; manipulating the height adjustment actuator 40 to obtain the correct length configuration of the apparatus 10 to properly support the user by depressing the lock button 48 into the button aperture 44 so as to disengage the lock button 48 from the currently occupied button aperture 44 to slidingly move the slide tube 42 in the correct direction to achieve the desired length and allowing the lock button 48 to engage into the appropriate button aperture 44; and using the walking cane 20 in a usual manner.

A user may wish to employ the light fixture 52 to cast a level of illumination 56 upon the intended path of travel. This can be achieved by depressing the light switch 54 a single time. This action will result in the light fixture 52 emitting the lowest level of illumination 56. If this is deemed to be an insufficient amount of illumination 56 to achieve the desired result, then the light switch 54 may be depressed a second time. This will cause the light fixture 52 to emit the highest level of illumination 56. The light fixture 52 may be deactivated by depressing the light switch 54 a third time.

A user may wish to utilize the apparatus 10 to clutch and retrieve any item in a size range which may fit within the grasping device 90. This can be achieved by having the apparatus 10 in the fully extended configuration as depicted in FIG. 1 and performing the following steps; elevating the distal section 80 in order to access the end cap assembly 160; rotating the end cap assembly 160 about the hinge pin 168 of the end cap hinge 162 away from the second end of the end cap 88; allowing the now unencumbered carriage extension spring 124 to liberate the grasping device 90 from the distal tube 82; permitting the carriage 92 to reach the fully extended position which will activate the electrical circuit 130 thus causing the grasp motor 116 to rotate in the proper direction to rotate the lead screw 122 thereby rotating the grasping fingers 102 about the finger pivot pins 112 to an open position; placing the grasping fingers 102 in proximity to the selected item; depressing the actuator switch 36 thereby causing electrical energy from the battery 34 to flow through the electrical circuit 130 to reverse the direction of rotation of the grasp motor 116 to exert the lead screw 122 to close the grasping fingers 102 to surround the selected item. The seized item may be subsequently relocated to a desired position and released from the grasping device 90 by releasing the actuator switch 36 which will result in opening the grasping fingers 102. The grasping device 90 may be retuned to a stored position within the distal tube 82 by again depressing the actuator switch 36 to close the grasping fingers 102 so as to fit within the distal tube 82; exerting a sufficient force at the finger tips 104 of the grasping fingers 102 to compress the carriage extension spring 124 to return the carriage 92 and the closed grasping fingers 102 to the interior of the distal tube 82 which will deactivate the electrical circuit 130 to the grasp motor 116; and rotating the end cap assembly 160 to fully engage the latch 178 within the detent 126 on the second end of the end cap 88 so as to restrain the grasping device 90. Alternately, a user may engage a single activation of the actuator switch 36 commands the grasp motor 116 to open the grasping device 90.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A cane, comprising:
   a first section, defining an interior first section cavity, having a first section first end a first section second end, and a height adjustment actuator, said height adjustment actuator comprising:
      a slide tube having a slide tube first end configured to slide within a slide tube second end;
      a spring tube having a spring tube first end and a spring tube second end;
      a first prong platform disposed within and subjacent to said spring tube second end;
      a pair of first prongs disposed within said first prong platform;
      a plurality of button apertures disposed along a length of said slide tube; and,
      a spring-biased lock button disposed inside of said spring tube first end which projects through any button aperture when aligned therewith;
   a handle, defining an interior handle cavity, secured perpendicularly to said first section first end, comprising:
      a handle first end;
      a handle second end;
      a grip disposed across an underside surface;
      a thumb pad secured at said handle first end;
      a hub secured perpendicularly and adjacent to said handle first end; and,
      an actuator switch disposed within said hub subjacent to said thumb pad and in electrical communication with a power source;
   a compartment located within said handle and retaining said power source therein;
   a second section defining an interior second section cavity and comprising:
      a second section first end slidably engaging with said first section second end;
      a second section second end;
      a second section neck having an opening disposed at said second section first end;
      a first receptacle platform disposed within and subjacent to said second section neck opening;
      a pair of first receptacles disposed within said first receptacle platform;
      a second prong platform disposed within and subjacent to said second section second end; and,
      a pair of second prongs disposed within said second prong platform, each prong being in electrical communication with said pair of first receptacles;
   a third section, defining an interior third section cavity, having a third section first end slidably engaging with said second section second end;
   a distal section, defining an interior distal section cavity, having a distal section first end slidably engaging with said third section second end and a distal section second end;
   an end cap assembly secured to said distal section second end to cover said interior distal section cavity thereof;
   a grasping device housed within said distal section and capable of protruding outward from a distal section second end;
   wherein each prong is in electrical communication with said power source and said actuator switch;
   wherein said pair of first prongs are configured to slidingly engage said pair of first receptacles when said second section neck is secured within said spring tube second end;
   wherein said spring-biased lock button may be selectively disengaged from a given said button aperture, thereby permitting said spring tube to extend or contract within said slide tube; and
   wherein said actuator switch selectively activates said grasping device.

2. The cane of claim 1, wherein said first section further comprises:
   a light fixture disposed along a leading side of said slide tube; and,
   a light switch located superjacent to said light fixture and in electrical communication with said light fixture and said power source.

3. The cane of claim 1, further comprising an eyelet secured to said hub.

4. The cane of claim 1, wherein said third section further comprises:
   a third section neck having an opening disposed at said third section first end;
   a second receptacle platform disposed within and subjacent to said third section neck opening;
   a pair of second receptacles disposed within said second receptacle platform;
   a third prong platform disposed within and subjacent to said third section second end; and,
   a pair of third prongs disposed within said third prong platform each prong being in electrical communication with said pair of second receptacles;
   wherein said pair of second prongs are configured to slidingly engage said pair of second receptacles when said third section neck is secured within said second section second end.

5. The cane of claim 4, wherein said distal section further comprises:
   a tube bell having an opening disposed at said distal section first end;
   a third receptacle platform disposed within and subjacent to said tube bell opening;
   a pair of third receptacles disposed within said third receptacle platform;
   a limit switch disposed subjacent said third receptacle platform and in electrical communication with said pair of third receptacles;
   a reversing relay disposed subjacent said limit switch in electrical communication with said pair of third receptacles; and,
   a grasping motor disposed subjacent said reversing relay in electrical communication with said pair of third receptacles and said reversing relay, further having a grasping motor first end and a grasping motor second end;

wherein said grasping device is in mechanical communication with said grasping motor;
wherein said end cap is hingedly secured over said distal section second end;
wherein said pair of third prongs are configured to slidingly engage said pair of third receptacles when said tube bell is secured within said third section second end; and,
wherein said grasping motor and reversing relay are in electrical communication with said power source and said actuator switch when said pair of third receptacles are secured about said pair of third prongs, when said pair of second receptacles are secured about said pair of second prongs, and when said pair of first receptacles are secured about said pair of first prongs.

6. The cane of claim 5, wherein said grasping device further comprises:
a carriage extension spring, secured within a distal end of said distal section tube cavity and secured to said grasping motor first end;
a lead screw projecting perpendicularly from said grasping motor second end and in mechanical communication with said grasping motor;
a mounting plate with a central aperture secured to said grasping motor second end with said lead screw positioned through said central aperture;
a pair of carriage first plates each having a pair of carriage first plate apertures;
a pair of carriage second plates secured in parallel on opposite sides of said central aperture and subjacent and perpendicularly secured to said carriage first plates;
a pair of grasping fingers each having a cog and an aperture at a proximal end thereof and a fingertip at a distal interior side end thereof;
a pair of pivot pins each securing one of said pair of grasping fingers within a pair of opposing said carriage first plate apertures; and,
a pair of pivot pin retainers retaining said one of said pair of grasping fingers to said pivot pin;
wherein each one of said grasping fingers is positioned with each said fingertip facing each other;
wherein each one of said grasping fingers is positioned with each said cog facing each other and in mechanical communication with said lead screw;
wherein when said carriage spring is liberated from said distal end of said distal section cavity by opening said end cap, full extension of said carriage spring activates said limit switch and subsequently said grasping motor, thereby resulting in a first rotation of said lead screw and motioning each said grasping finger apart;
wherein when said actuator switch is activated, said lead screw rotates in a second direction, thereby motioning each said grasping finger together; and,
wherein when said actuator switch is deactivated, said lead screw rotates in said first direction thereby motioning each said grasping finger apart.

7. The cane of claim 4, further comprising:
a first elastic cord tethering said first prong platform to said first receptacle platform;
a second elastic cord tethering said second prong platform to said second receptacle platform; and,
a third elastic cord tethering said third prong platform to said third receptacle platform;
wherein said first elastic cord, second elastic cord and third elastic cord each comprise a waterproof material.

8. A cane, comprising:
a first section, defining an interior first section cavity, having a first section first end a first section second end, and a height adjustment actuator, said height adjustment actuator comprising:
a slide tube having a slide tube first end configured to slide within a slide tube second end;
a spring tube having a spring tube first end and a spring tube second end;
a first prong platform disposed within and subjacent to said spring tube second end;
a pair of first prongs disposed within said first prong platform;
a plurality of button apertures disposed along a length of said slide tube; and,
a spring-biased lock button disposed inside of said spring tube first end which projects through any button aperture when aligned therewith;
a handle, defining an interior handle cavity, secured perpendicularly to said first section first end, comprising:
a handle first end;
a handle second end;
a thumb pad secured at said handle first end;
a hub secured perpendicularly and adjacent to said handle first end; and,
an actuator switch disposed within said hub subjacent to said thumb pad and in electrical communication with a power source;
a compartment located within said handle and retaining said power source therein;
a second section defining an interior second section cavity and comprising:
a second section first end slidably engaging with said first section second end;
a second section second end;
a second section neck having an opening disposed at said second section first end;
a first receptacle platform disposed within and subjacent to said second section neck opening;
a pair of first receptacles disposed within said first receptacle platform;
a second prong platform disposed within and subjacent to said second section second end; and,
a pair of second prongs disposed within said second prong platform, each prong being in electrical communication with said pair of first receptacles;
a distal section, defining an interior distal section cavity, having a distal section first end slidably engaging with said second section second end and a distal section second end;
an end cap assembly secured to said distal section second end to cover said interior distal section cavity thereof;
a grasping device housed within said distal section and capable of protruding outward from a distal section second end;
wherein each prong is in electrical communication with said power source and said actuator switch;
wherein said pair of first prongs are configured to slidingly engage said pair of first receptacles when said second section neck is secured within said spring tube second end;
wherein said spring-biased lock button may be selectively disengaged from a given said button aperture, thereby permitting said spring tube to extend or contract within said slide tube; and wherein said actuator switch selectively activates said grasping device.

9. The cane of claim 8, wherein said first section further comprises:
a light fixture disposed along a leading side of said slide tube; and,
a light switch located superjacent to said light fixture and in electrical communication with said light fixture and said power source.

10. The cane of claim 8, further comprising an eyelet secured to said hub.

11. The cane of claim 8, wherein said distal section further comprises:
a tube bell having an opening disposed at said distal section first end;
a second receptacle platform disposed within and subjacent to said tube bell opening;
a pair of second receptacles disposed within said second receptacle platform;
a limit switch disposed subjacent said second receptacle platform and in electrical communication with said pair of second receptacles;
a reversing relay disposed subjacent said limit switch and in electrical communication with said pair of second receptacles; and,
a grasping motor disposed subjacent said reversing relay and in electrical communication with said pair of second receptacles and said reversing relay, further having a grasping motor first end and a grasping motor second end;
wherein said grasping device is in mechanical communication with said grasping motor;
wherein said end cap is hingedly secured over said distal section second end;
wherein said pair of second prongs are configured to slidingly engage said pair of second receptacles when said tube bell is secured within said second section second end; and,
wherein said grasping motor and reversing relay are in electrical communication with said power source and said actuator switch when said pair of second receptacles are secured about said pair of second prongs, when said pair of second receptacles are secured about said pair of second prongs, and when said pair of first receptacles are secured about said pair of first prongs.

12. The cane of claim 11, wherein said grasping device further comprises:
a carriage extension spring, secured within said distal end of said distal section cavity and secured to said grasping motor first end;
a lead screw projecting perpendicularly from said grasping motor second end and in mechanical communication with said grasping motor;
a mounting plate with a central aperture secured to said grasping motor second end with said lead screw positioned through said central aperture;
a pair of carriage first plates each having a pair of carriage first plate apertures;
a pair of carriage second plates secured in parallel on opposite sides of said central aperture and subjacent and perpendicularly secured to said carriage first plates;
a pair of grasping fingers each having a cog and an aperture at a proximal end thereof and a fingertip at a distal interior side end thereof;
a pair of pivot pins each securing one of said pair of grasping fingers within a pair of opposing said carriage first plate apertures; and,
a pair of pivot pin retainers retaining said one of said pair of grasping fingers to said pivot pin;
wherein each one of said grasping fingers is positioned with each said fingertip facing each other;
wherein each one of said grasping fingers is positioned with each said cog facing each other and in mechanical communication with said lead screw;
wherein when said carriage spring is liberated from said distal end of said distal section cavity by opening said end cap, full extension of said carriage spring activates said limit switch and subsequently said grasping motor, thereby resulting in a first rotation of said lead screw and motioning each said grasping finger apart;
wherein when said actuator switch is activated, said lead screw rotates in a second direction, thereby motioning each said grasping finger together; and,
wherein when said actuator switch is deactivated, said lead screw rotates in said first direction thereby motioning each said grasping finger apart.

13. The cane of claim 11, further comprising:
a first elastic cord tethering said first prong platform to said first receptacle platform; and,
a second elastic cord tethering said second prong platform to said second receptacle platform;
wherein said first elastic cord and second elastic cord each comprise a waterproof material.

14. The cane of claim 8, wherein said handle further comprises a grip disposed across an underside surface thereof.

* * * * *